US005893020A

United States Patent [19]
Atsumi

[11] Patent Number: 5,893,020
[45] Date of Patent: Apr. 6, 1999

[54] DIGITAL COPYING MACHINE CAPABLE OF TWO-SIDED COPYING

[75] Inventor: Tomoyuki Atsumi, Toyohashi, Japan

[73] Assignee: Minolta Co., Ltd., Osaka, Japan

[21] Appl. No.: 853,073

[22] Filed: May 8, 1997

[30] Foreign Application Priority Data

May 8, 1996 [JP] Japan ................................ 8-113362

[51] Int. Cl.⁶ .................................................. G03G 15/00
[52] U.S. Cl. ............................ 399/364; 399/85; 399/401
[58] Field of Search ............................... 399/82, 85, 361, 399/364, 388, 389, 396, 400, 401, 402, 405, 381; 271/270, 264

[56] References Cited

U.S. PATENT DOCUMENTS

| | | | |
|---|---|---|---|
| 4,462,681 | 7/1984 | Aerts et al. | 399/364 |
| 4,618,247 | 10/1986 | Tsuji . | |
| 4,935,786 | 6/1990 | Veeder | 399/401 |
| 4,956,678 | 9/1990 | Kiya et al. | 399/401 |
| 5,337,135 | 8/1994 | Malachowski et al. | 399/401 |
| 5,557,391 | 9/1996 | Kato et al. | 399/401 |
| 5,629,762 | 5/1997 | Maahoney et al. | 399/364 |
| 5,669,039 | 9/1997 | Ohtsuka et al. | 399/400 X |

FOREIGN PATENT DOCUMENTS

| | | |
|---|---|---|
| 60-086562 | 5/1985 | Japan . |
| 60-086563 | 5/1985 | Japan . |
| 60-086564 | 5/1985 | Japan . |
| 60-086565 | 5/1985 | Japan . |
| 60-198530 | 10/1985 | Japan . |
| 61-219967 | 8/1986 | Japan . |
| 61-261753 | 11/1986 | Japan . |
| 62-203151 | 9/1987 | Japan . |
| 4-086678 | 3/1992 | Japan . |

*Primary Examiner*—Sandra Brase
*Attorney, Agent, or Firm*—Sidley & Austin

[57] ABSTRACT

A digital copying machine capable of two-sided copying, which forms an image on one side of a paper sheet, transports the paper sheet through a sheet re-feeding path provided with a sheet turning over unit, forms an image on the other side of the paper sheet, and finally delivers the paper sheet outside. When two-sided copy mode is set in accordance with an instruction from the user, paper sheets are supplied at sheet intervals shorter than sheet intervals at which paper sheets are supplied in one-sided copy mode.

19 Claims, 7 Drawing Sheets

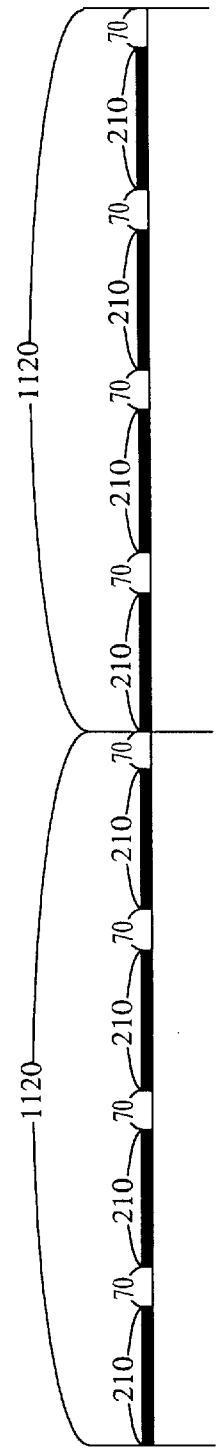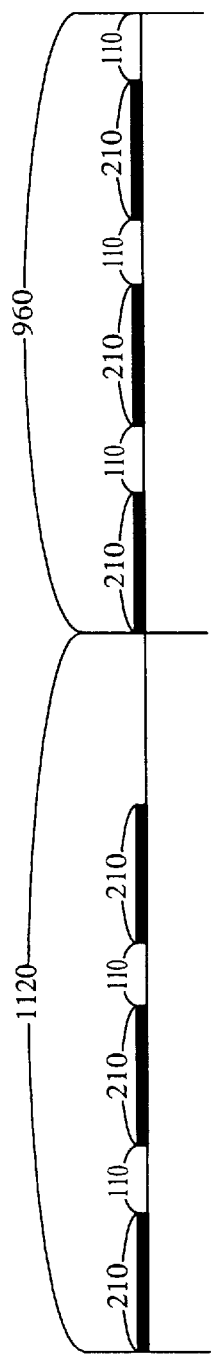

DIGITAL COPYING MACHINE CAPABLE OF TWO-SIDED COPYING

BACKGROUND OF THE INVENTION (1) Field of the Invention

The present invention relates to a copying machine which performs two-sided copying, more particularly to a digital copying machine having a circular-type duplex function.

(2) Related Art

Digital copying machines having a circular-type duplex function have been proposed in the past. With the digital copying machine of this type, two-sided copying in a two-sided copy mode is performed in the following manner.

A copying sheet fed from a sheet cassette is transported to a toner image transferring position, where a toner image is transferred onto one side of the copying sheet. The copying sheet is then transported to a fixing unit, by which the toner image is fixed onto the sheet surface with heat. The copying sheet with an image copied on one side is returned to the toner image transferring position through a sheet re-feeding path including a sheet turning over device. Another image is ther formed on the other side of the copying sheet in the same manner. The copying sheet with an image formed on each side is discharged outside the copying machine without passing through the sheet re-feeding path. The passage starting from and ending back in the toner image transferring position via the sheet re-feeding path is called a circular transport path. When performing two-sided copying on a plurality of copying sheet successively, copying sheets simultaneously containable in the circular transport path are fed from a sheet cassette, and two-sided copying is performed on all the sheets. The same number of copying sheets are then fed from the sheet cassette, and the same process is repeated until two-sided copying is completed on a predetermined number of copying sheets.

When a one-sided copy mode is selected, copying sheets with an image formed on one side are discharged outside the copying machine without passing through the sheet re-feeding path.

With the copying machine having the above structure, an interval between copying sheets is determined in advance so that the heat-fixing of a toner image is not adversely affected when performing one-sided copying on a plurality of copying sheets successively. In the case of large size sheets, the sheet intervals are made long so as to prevent the fixing unit from cooling, while in the case of small size sheets, the sheet intervals are made short.

With the conventional copying machine, however, there is a problem that the two-sided copying speed is sometimes lower than the one-sided copying speed, depending on the sheet size in successive copying.

SUMMARY OF THE INVENTION

The first object of the present invention is to provide a digital copying machine which performs two-sided copying at a higher copying speed than a conventional copying machine.

The second object of the present invention is to provide a digital copying machine which performs two-sided copying at a higher copying speed, without raising the heating temperature of the fixing unit.

The third object of the present invention is to provide a technique of performing two-sided copying at a higher copying speed, which can be applied to a conventional copying machine.

The fourth object of the present invention is to provide a digital copying machine which performs two-sided copying at a high copying speed regardless of copying sheet size.

The fifth object of the present invention is to provide an image forming method desirably applicable to the copying machine of the present invention.

The first, second, third, and fourth objects can be achieved by providing a digital copying machine capable of two-sided copying, which forms an image on one side of a copying sheet, transports the copying sheet through a sheet re-feeding path provided with a sheet turning over unit, forms an image on the other side of the copying sheet, and finally discharges the copying sheet, comprising: an image forming mode setting unit for setting either a one-sided copy mode or a two-sided copy mode in accordance with an instruction from a user; a sheet supplying unit for supplying copying sheets one by one; an image forming unit for forming an image on a copying sheet being supplied; a sheet transporting unit for leading a copying sheet with an image formed on one side of it to the sheet re-feeding path in the two-sided copy mode, and discharging a copying sheet with an image formed on each side of it in the two-sided copy mode or a copying sheet with an image formed on one side of it in the one-sided copy mode.

With such structure, the control unit controls the sheet feeding unit so that two-sided copying is performed at sheet intervals shorter than in one-sided copying. As a result, more two-sided copies can be made in a unit time, because two-sided copying is performed at a higher speed.

The first, second, third, and fourth objects of the present invention may also be achieved by providing a digital copying machine capable of two-sided copying, which forms an image on one side of a copying sheet fed from a sheet feeding tray, stores the copying sheet temporarily in a two-sided copy tray, forms an image on the other side of the copying sheet re-fed from the two-sided copy tray, and finally discharges the copying sheet, and which comprises a sheet re-feeding unit for re-feeding copying sheets from the two-sided copy tray at intervals shorter than intervals at which the sheet feeding tray feeds copying sheets.

With this structure, the copying sheets on the two-sided copy tray are re-fed at sheet intervals shorter than sheet intervals at which copying sheets are fed from a sheet feeding tray, so that two-sided copying can be performed on more copying sheets at a higher copying speed.

The fifth object of the present invention can be achieved with an image forming method using a digital copying machine comprising: an image forming mode setting unit for setting either a one-sided copy mode or a two-sided copy mode in accordance with an instruction from a user; a sheet supplying unit for supplying copying sheets one by one; an image forming unit for forming an image on a copying sheet being supplied; a sheet transporting unit for leading a copying sheet with an image formed on one side of it to a sheet re-feeding path in the two-sided copy mode, and discharging a copying sheet with an image formed on each side of it in the two-sided copy mode or a copying sheet with an image formed on one side of it in the one-sided copy mode, comprising the steps of judging whether the one-sided copy mode or the two-sided copy mode has been set, and in the two-sided copy mode, supplying copying sheets at sheet intervals shorter than sheet intervals at which copying sheets are supplied in the one-sided copy mode.

According to this method, in the two-sided copy mode set through an instruction sent from a user, copying sheets are fed at sheet intervals shorter than the sheet intervals predetermined for the one-sided copying. As a result, more two-sided copies can be made, because the two-sided copying is performed at a higher speed.

BRIEF DESCRIPTION OF THE DRAWINGS

These and other objects, advantages and features of this invention will become apparent from the following description thereof taken in conjunction with the accompanying drawings which illustrate a specific embodiment of the invention. In the drawings:

FIG. 6A shows the process of transport printing.

FIG. 6B shows the process of transport printing.

DESCRIPTION OF THE PREFERRED EMBODIMENTS

First Embodiment

Figure 1:
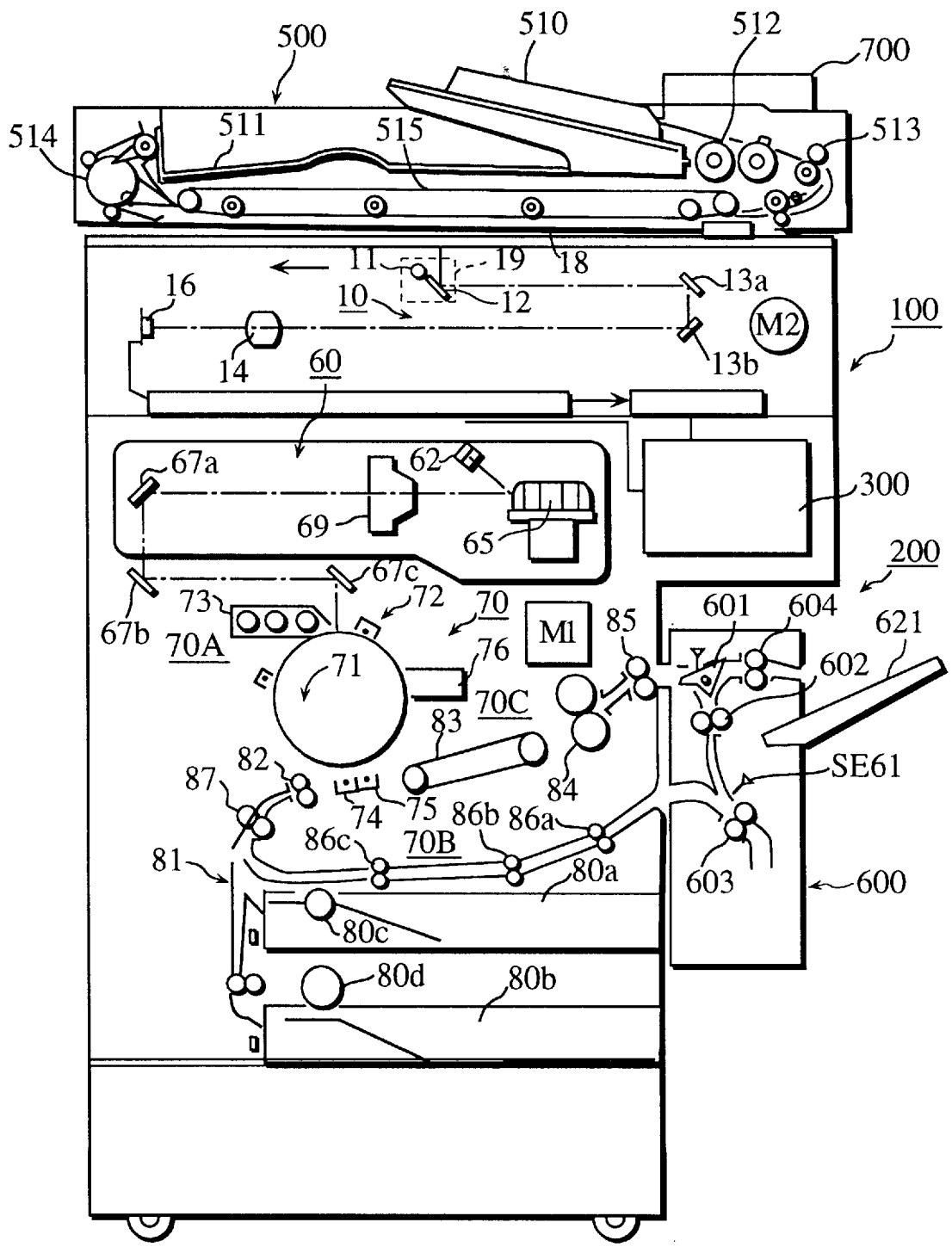
FIG. 1 shows the overall structure of a digital copying machine of the present invention.

FIG. 1 shows the overall structure of the digital copying machine of the embodiment of the present invention. The digital copying machine consists of a reading unit 100 for reading an original document and a printer unit 200 for printing an image from the original document read by the reading unit 100.

The reading unit 100 comprises a document transport unit 500 for transporting an original document fed from a document feeding tray and for turning the original document over when necessary, and a scanning system 10 for reading the original document and converting the read image into image signals.

The printing unit 200 comprises an optical system 60 for exposing a photosensitive drum 71, an image forming system 70 for developing an electrostatic latent image formed by the exposure and for transferring and fixing the image onto a copying sheet, and a re-feeding unit 600 for turning over a copying sheet and sending it back to the transferring position.

The document transport unit 500 consists of a document: feeding tray 510, a discharge tray 511, transport rollers 512, 513, and 514, and a transport belt 515. An original document placed on the document feeding tray 510 is carried onto a document glass plate 18. The original document is then read by a scanner 19 and discharged onto the discharge tray 511.

The scanning system 10 comprises an exposure lamp 11 attached to the scanner 19 moving below the document glass plate 18, a first mirror 12, fixed mirrors 13a and 13b, a converging lens 14, a photoelectric conversion unit 16 formed by a CCD array or the like, and a scanner motor M2. An original document transported from the document transport unit 500 onto the document glass plate 18 is read by the photoelectric conversion unit 16 and converted into electric signals.

The optical system 60 consists of a semiconductor laser 62, a polygon mirror 65 for deflecting a laser beam emitted from the semiconductor laser 62, a scanning lens 69, and reflecting mirrors 67a, 67b, and 67c. An electrostatic latent image is formed by exposing the surface of the photosensitive drum 71 to the laser beam.

The image forming system 70 is made up of a development transfer system 70A, a transport system 70B, and a fixing system 70C. The development transfer system 70A includes the photosensitive drum 71, and it also includes, in the vicinity of the photosensitive drum 71, a sensitizing charger 72, a developing unit 73, a transfer charger 74, a separating charger 75, and a cleaning unit 76. After the electric latent image has been formed on the photosensitive drum 71, a toner image is formed and transferred onto the surface of a copying sheet.

The transport system 70B comprises cassettes 80a and 80b for accommodating copying sheets, a paper guide 81, an intermediate roller 87, a timing roller 82, a transport belt 83, and transport rollers 86a, 86b, and 86c for transporting a copying sheet fed from the re-feeding unit 600 when copying an image on both sides of the copying sheet. The transport system 70B receives, carries, and discharges copying sheets. The paper cassettes 80a and 80b are provided with feeding rollers 80c and 80d, respectively. Paper sheets are delivered one by one from a selected paper cassette through the rotation of the feeding rollers 80c and 80d. When performing two-sided copying, the copying sheet passes through the transport rollers 86a, 86b, and 86c, the timing roller 82, the transport belt 83, and the re-feeding unit 600.

The fixing system 70C comprises a fixing roller 84 for fixing toners on a copying sheet with heat and a transport roller 85. A heater (not shown in FIG. 1) for heating the fixing roller 84 has a heat value equal to the amount of heat absorbed by the copying sheets passing successively through the fixing roller 84 per unit time when repeating one-sided copying.

The re-feeding unit 600 comprises a switching claw 601 for switching between discharging and re-feeding, a transport roller 602, a switchback roller 603, and a switchback sensor SE61. In a two-sided copy mode, a copying sheet transported through the transport roller 85 is turned over and fed to the transport roller 86a of the transport system 70B.

The above process of re-feeding a copying sheet is performed by the re-feeding unit 600 as follows. The left edge of the switching claw 601 is lifted upward by a solenoid (not shown in FIG. 1), and a copying sheet is transported through the transport roller 85. The transported copying sheet is led to the transport roller 602 and reaches the switchback roller 603, which pulls the copying sheet downward. If the switchback sensor SE61 detects the bottom edge of the copying sheet, the rotational direction of the switchback roller 603 are reversed to turn the copying sheet over. The copying sheet is then led to the transport roller 86a. When the copying sheet should be discharged onto a discharge tray 621, the left edge of the switching claw 601 moves downward to discharge the copying sheet onto the discharge tray 621 through the discharging roller 604.

Figure 2:
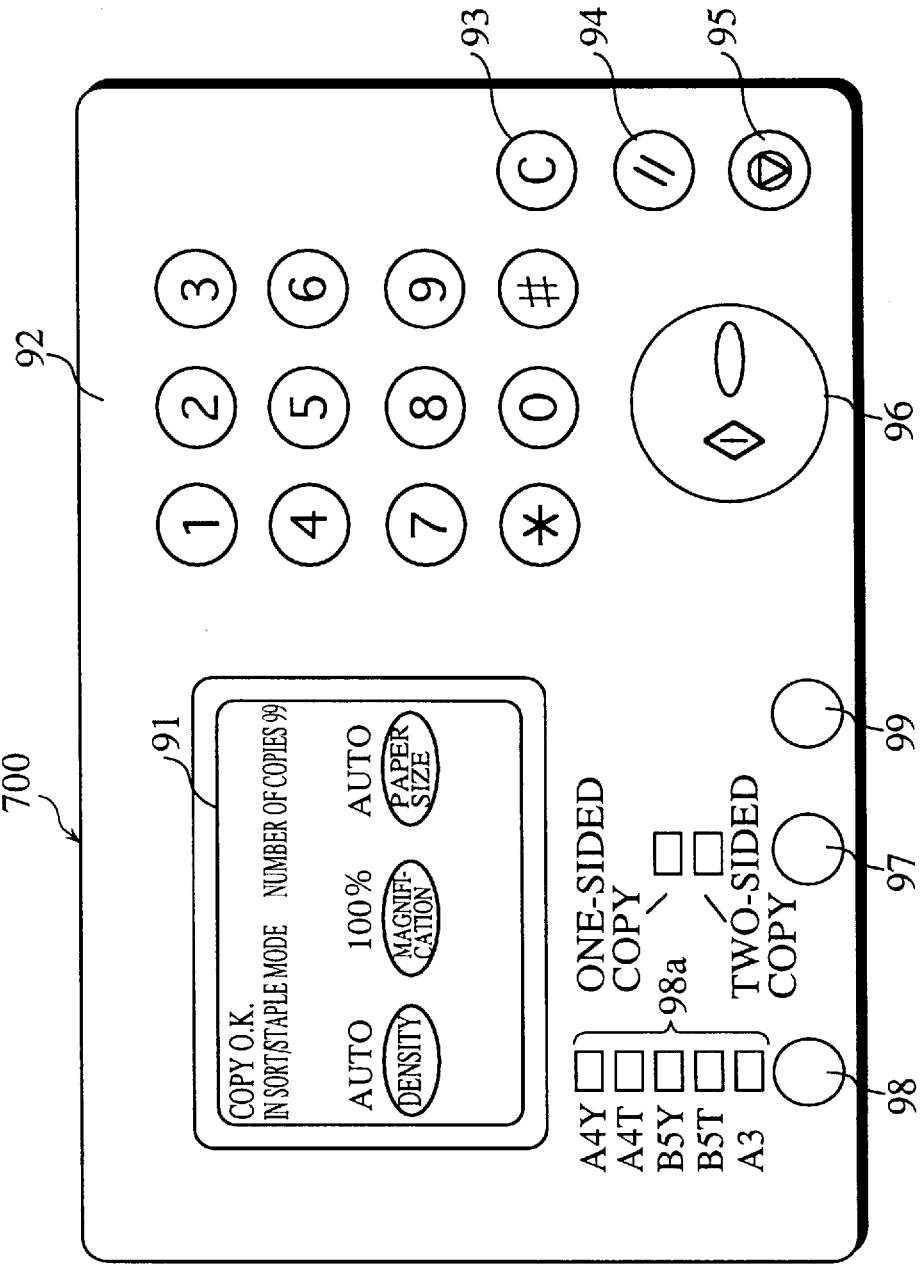
FIG. 2 shows the structure of the operation panel of the digital copying machine.

As shown in FIG. 2, an operation panel 700 is provided on the upper part of the main body. The operation panel 700 includes a liquid crystal touch panel 91, a 10-key pad 92 for inputting the number and magnification of copies to be made, a clear key 93 for clearing the number and magnification of copies, a panel reset key 94 for resetting all set values to the standard values, a stop key 95 for stopping a copying operation, a start key 96 for starting a copying operation, a mode set key 97 for setting either a two-sided copy mode or a one-sided copy mode, and a paper select key 98 for selecting the size of a copying sheet. The size of a copying sheet selected by the paper select key 98 is indicated by a paper size display unit 98a. For instance, A4Y indicates A4 paper sheets placed transversely, and B5T indicates B5 paper sheets placed longitudinally. The transverse setting is to set paper sheets in a direction perpendicular to the sheet transport direction, and the longitudinal setting is to set paper sheets in a direction parallel to the sheet transport direction. The liquid crystal touch panel 91 receives instructions as to density, magnification, and paper size. It also displays the current job status of the copying machine.

Figure 3:
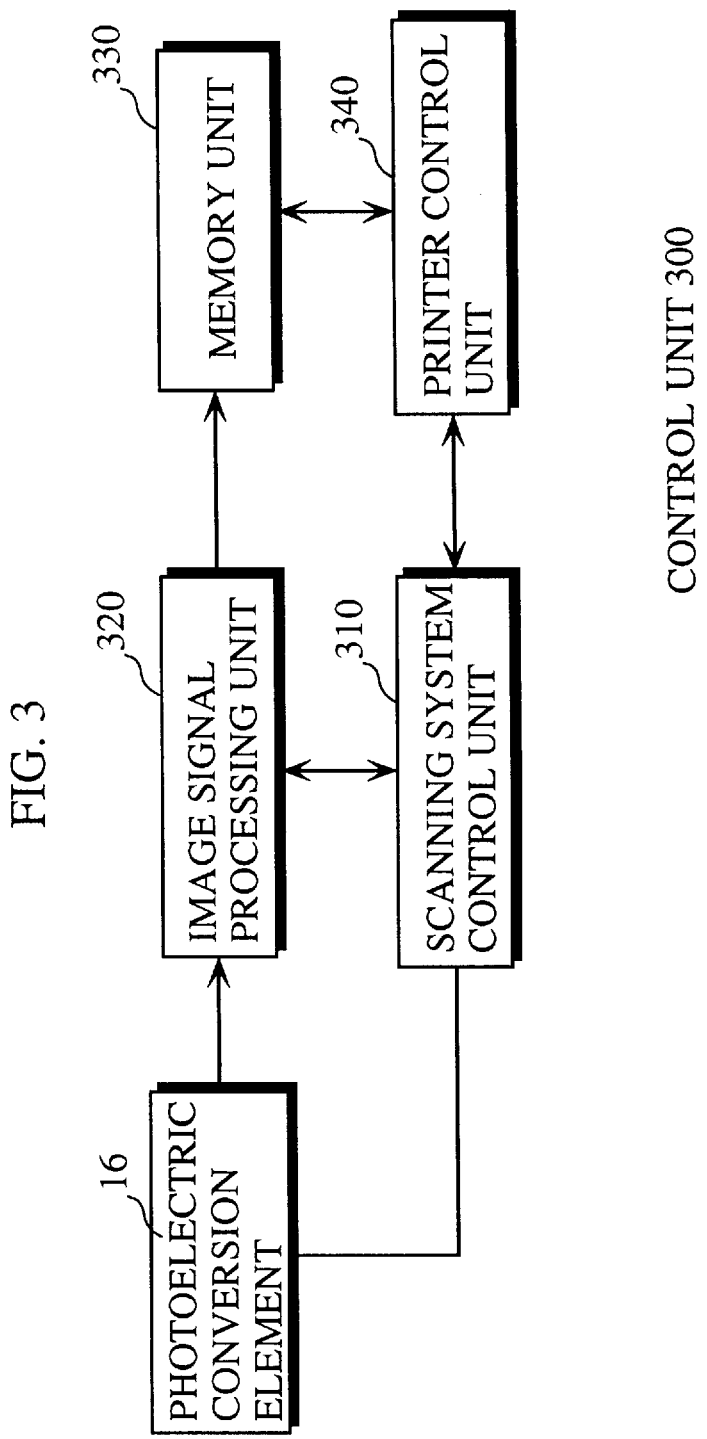
FIG. 3 is a block diagram of the control unit of the copying machine.

FIG. 3 is a block diagram of the control unit 300 of the digital copying machine. The control unit 300 comprises a scanning system control unit 310, an image signal processing unit 320, a memory unit 330, and a printer control unit 340.

The scanning system control unit 310 controls all the operations of the scanning system 10 when reading an original document. The operations of the scanning system 10 include switching on and off the photoelectric conversion element 16 and the exposure lamp 11, and the operation of the scanner 19 driven by the scanner motor M2.

The image signal processing unit 320 processes image signals outputted from the photoelectric conversion element 16 to obtain the optimum reproduction images, and outputs the processed image signals as image data to the memory unit 330.

The memory unit 330 comprises an image memory, a compressor, and an expander. The image data outputted from the image signal processing unit 320 are compressed and temporarily stored into the memory unit 330.

The printer control unit 340 controls the components of the printer unit 200. In accordance with the image data stored in the memory unit 330, the printer control unit 340 controls the output of the semiconductor laser 62, the sheet supply from the paper cassette 80a or 80b, the transport operation of paper sheets, the rotation of the photosensitive drum 71, and the electric supply to the chargers. All of these operations are collectively and synchronously controlled. The printer control unit 340 also determines the intervals between paper sheets being transported and the paper size, depending on the copy mode, and controls the sheet supply and sheet transport so as to perform a copying operation at the determined sheet intervals. Paper sheets can be supplied at the determined sheet intervals by adjusting the drive intermission of the feeding roller 80c or 80d to the determined sheet intervals.

In the one-sided copy mode, a sheet interval value is selected from the values of sheet intervals for one-sided copying stored in an internal memory, in accordance with the size of the supplied copying sheet. Even in the two-sided copy mode, when the circulation cycle has already been performed an odd number of times, a sheet interval for one-sided copying is set. Here, one circulation cycle refers to a process of printing the front side of each of a predetermined number of copying sheets and then printing the back side of each of the copying sheets. When the circulation cycle has been performed an even number of times in the two-sided copy mode, sheet intervals are selected from sheet intervals stored in the internal memory in accordance with the size of a copying sheet supplied. The sheet intervals for two-sided copying stored in the internal memory of the printer control unit 340 are shorter than the sheet intervals for one-sided copying. The sheet intervals in the two-sided copy mode are made shorter so that the number of copies to be made in one circulation cycle is at least one larger than in the one-sided copy mode. The reason why the sheet intervals in the two-sided copy mode can be shorter than in the one-sided sheet intervals is that the amount of heat taken from the fixing roller by paper sheets in the two-sided copy mode is smaller. For instance, if the number of paper sheets passing through the fixing roller in the two-sided copy mode is the same as in the one-sided copy mode, the amount of heat taken away from the fixing roller per unit time in the two-sided copy mode is smaller than in the one-sided copy mode, because in the two-sided copy mode, paper sheets passing through the fixing roller have already been heated at the time of printing on the front side, but in the one-sided copy mode, paper sheets passing through the fixing roller have not been heated at all. When the circulation cycle process is to be performed for an odd number repetition, the sheet intervals for one-sided copying are set so that the copying speed will not be too fast by setting short sheet intervals. The setting of sheet intervals is shown in the control charts of FIG. 4, but it will be described later in detail.

Figure 5:
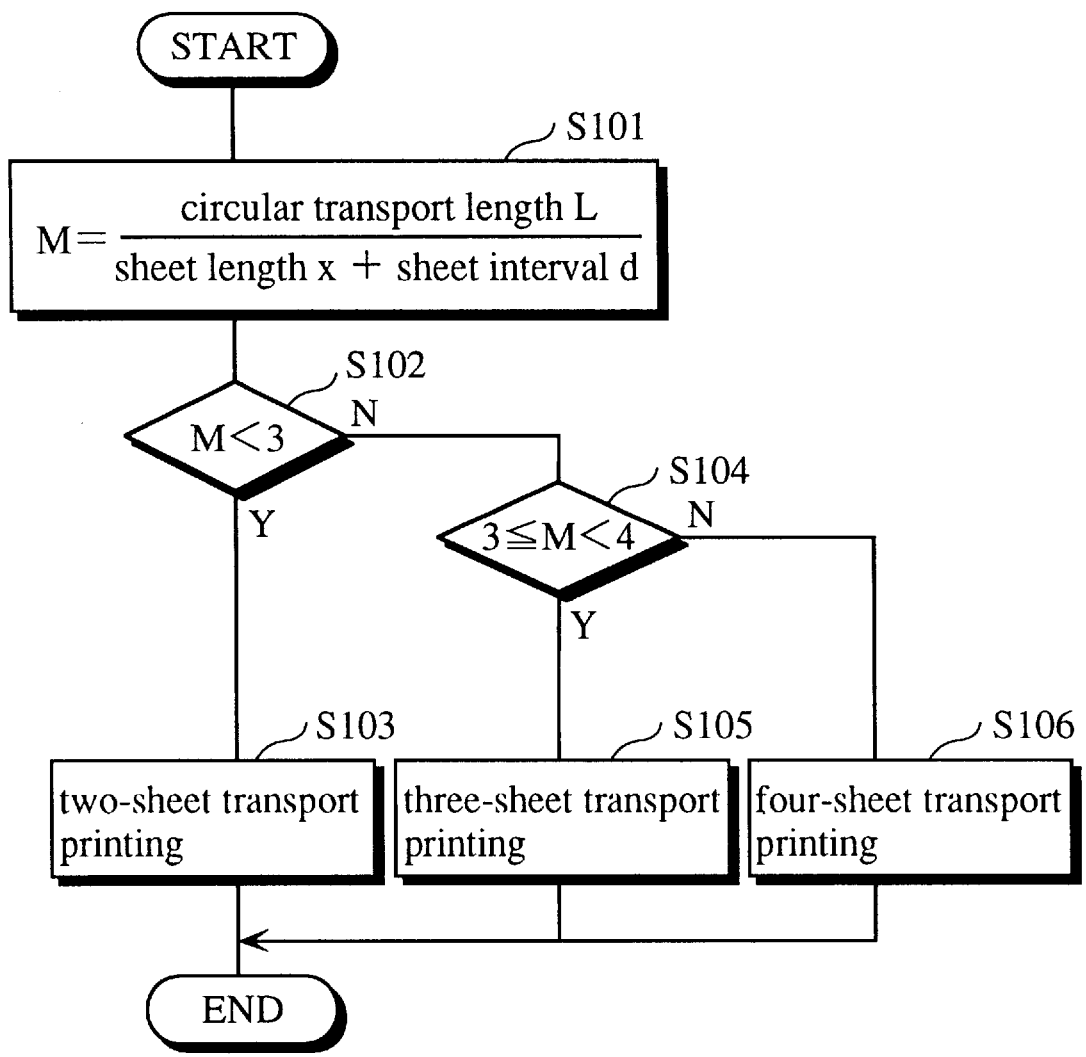
FIG. 5 is a control flow chart of the printer control unit when performing transport printing in the two-sided copy mode.

The printer control unit 340 performs the paper supply and the printing in accordance with the control flow chart shown in FIG. 5, especially when in the two-sided copy mode. Before describing the operation, the characteristic steps of the control flow chart are described below.

In step S101, the printer control unit 340 determines the number of paper sheets held in the circular transport path. Thus, the number M of paper sheets to be printed in one circulation cycle is determined. More specifically, the number M is determined by dividing the circular transport path length L by the total of the sheet length x and the sheet interval length. The circular transport path length L is the length of the passage through which paper sheets are transported. As shown in FIG. 1, paper sheets are transported through the circular transport path consisting of the timing roller 82 as the starting point, the transport belt 83, the re-feeding unit 600, and the transport rollers 86a to 86c. The paper sheets are then sent back to the timing roller 82. (The transport path length L will be the same even if it starts from and ends in the position where a toner image formed on the photosensitive drum 71 is transferred onto the surface of a paper sheet.)

In steps S103, S105, and S106, the printer control unit 340 performs two-sheet transport printing when the integral part of the determined value M is "2", three-sheet transport printing when the integral part of the value M is "3", and four-sheet transport printing when the integral part of the value M is "4". When performing the two-sheet transport printing, two paper sheets are taken out of a paper cassette at sheet intervals d, the front side of each paper sheet is printed, the re-feeding unit 600 turns each paper sheet over, and then an image is printed on the back side of each paper sheet. Likewise, the three-sheet transport printing and the four-sheet transport printing are performed for three paper sheets and four paper sheets, respectively.

Intervals between electrostatic latent image formation on the photosensitive drum 71 by a laser beam from the photosensitive laser 62 are determined from sheet feeding intervals. After the feeding roller has fed the predetermined number of paper sheets, the printer control unit 340 suspends the rotational drive of the feeding roller until two-sided copying is completed on the fed paper sheets.

Figure 4:
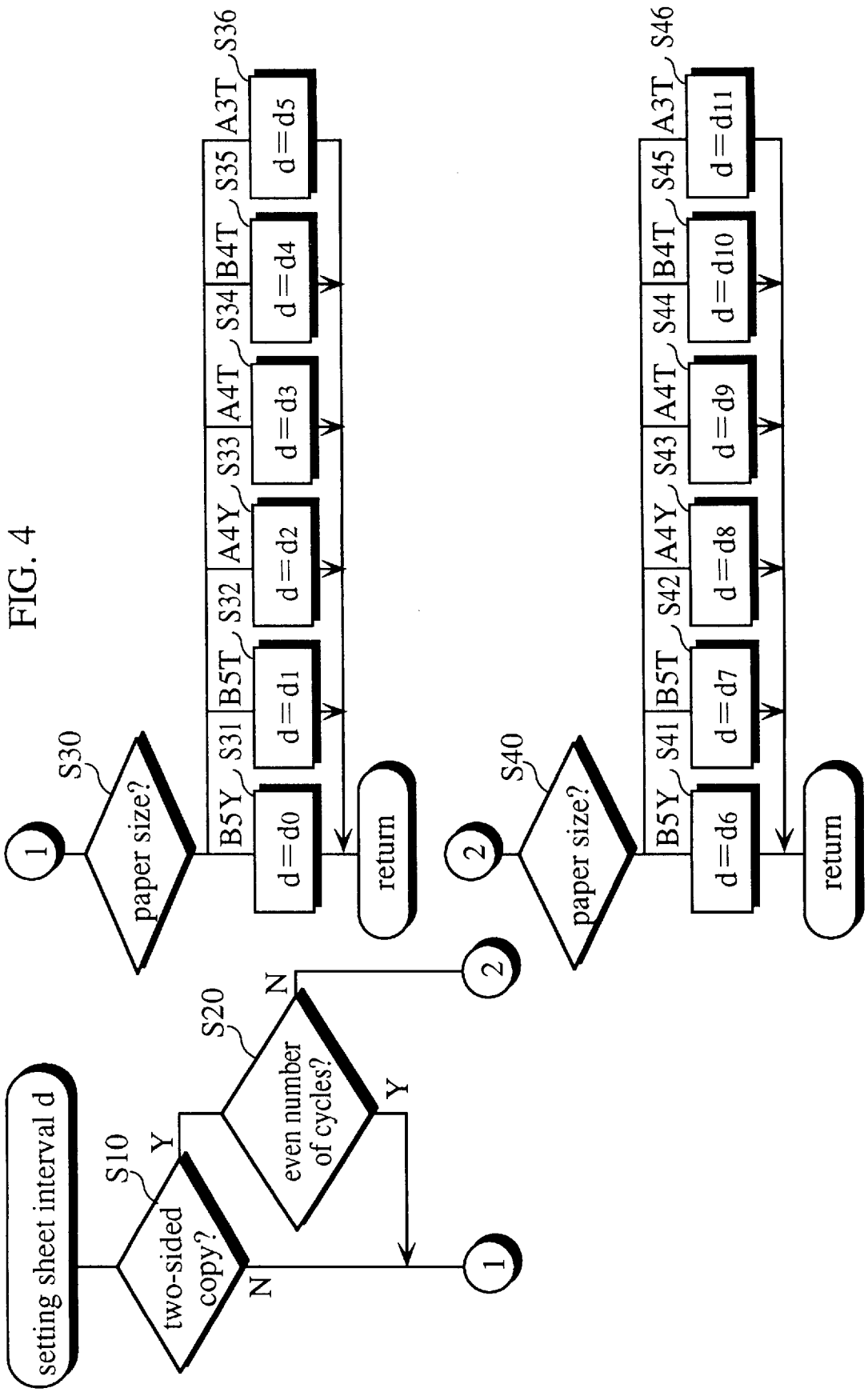
FIG. 4 shows flow charts of the printer control unit of the control unit when determining sheet intervals.

The following explanation is for the operation of the printer control unit 340, with reference to the flow charts of FIGS. 4 and 5.

As shown in FIG. 4, if the copying machine is currently in the two-sided copy mode (step S10), and if the circulation cycle is performed for the first time (step S20), one of the shorter sheet interval values d6 to d11 for two-sided copying is selected in accordance with the paper size designated through the operation panel (step S40, and steps S41 to S46). For instance, if the size A4Y is designated, the sheet interval value d8 corresponding to the paper size A4Y is selected (step S43).

As shown in FIG. 5, the number M of paper sheets to be printed in one circulation cycle is determined (step S101). Here, the circular transport path length L is set at 1120 mm, and the sheet interval value d8 is set at 70 mm. The value M, which indicates the number of sheet paper held in the circular transport path, can be determined as follows:

$$M = L/(x+d) = 1120/(210+70) = 4$$

where the sheet length (paper size A4Y) x is 210 mm. Since the value M is 4 (steps S102 and S104), the four-sheet transport printing is performed (step S106).

The next circulation cycle is the second-time circulation cycle, i.e., the circulation cycle process is to be performed for an even number repetition (steps S10 and S20), and a sheet interval value d2 for one-sided copying is selected (steps S30 and S33). If the sheet interval d2 is set at 110 mm, the value M is determined as follows:

$$M = 1120/(210+110) = 3.5 \quad \text{(step S101)}$$

The value M is judged to be $3 \leq M \leq 4$ (steps S102 and S104), and the three-sheet transport printing is performed (step S105). From the above description, it is clear that when using a sheet interval value for one-sided copying, the three-sheet transport printing is performed, and when using a sheet interval value for two-sided copying, the four-sheet transport printing is performed.

Likewise, when the circulation cycle process is performed for an odd number repetition (steps S10 and S20), the two-sided copying sheet interval value d8 is selected (steps S40 and S42), and the four-sheet transport printing is performed (steps S101, S102, S104, and S106). When the circulation cycle process is performed for an even number repetition, the one-sided copying sheet interval value d2 is selected (steps S30 and S32), and the three-sheet transport printing is performed (steps S101, S102, S104, and S105).

In the digital copying machine of this embodiment, a two-sided copying sheet interval is shorter than a one-sided copying sheet interval. For instance, when using a one-sided copying sheet interval value, three-sheet transport printing is performed, and when using a two-sided copying sheet interval value, four-sheet transport printing is performed, so that one more copy can be made in one circulation cycle, and that the copying process can be speeded up. Furthermore, in the two-sided copy mode, the copying speed is controlled by using a one-sided copying interval value when the circulation cycle process is performed for an odd number repetition, in order to prevent the copying speed from being too fast, and the temperature of the fixing roller from dropping. Thus, deterioration of the toner fixing can be avoided.

The following is the results of comparisons between the digital copying machine of this embodiment and a conventional copying machine. When using a paper sheet size A4Y, the two-sided copying speed A1 of the digital copying machine of this embodiment is 31.12 cpm (copies per minute), which is 13% faster than the two-sided copying speed A2, 27.69 cpm, of the conventional copying machine.

The one-sided copying speed A3 of this embodiment is 30 cpm, and it became apparent that the copying speed A1 is not very different from the copying speed A3.

The above copying speeds are determined as follows.

(1) Firstly, the sheet transporting speed V of the transport system of the digital copying machine of this embodiment is set at 160 mm/sec, the sheet length of A4Y paper x is set at 210 mm, and the circular transport path length L is set at 1120 mm.

In this embodiment, the four-sheet transport printing and the three-sheet transport printing are repeated in turn. Therefore, in order to determine the copying speed A1, the copying times required for the four-sheet transport printing and the three-sheet transport printing are calculated.

In the case of the four-sheet transport printing, four paper sheets pass through the circular transport path at sheet intervals d8 (=70 mm), as shown in FIG. 6A. The front side of each paper sheet is printed first, and after that, the back side is printed. Accordingly, the copying time T4 required for printing eight images on both sides of the four paper sheets is determined by dividing two circular transport path lengths L by the transporting speed V.

$$T4 = (1120+1120)/V = 14 \text{ (sec)}$$

Likewise, in the case of the three-sheet transport printing, three paper sheets pass through the circular transport path at sheet intervals d2 (=110 mm), as shown in FIG. 6B. Between the front-side printing of the third paper sheet and the back-side printing of the first paper sheet, there is an interval longer than the sheet interval, 110 mm. Accordingly, the copying time T3 required for printing six images on both sides of the three paper sheets is determined by dividing the circulation path length plus the three sheet lengths and sheet intervals by the transporting speed V.

$$T3 = (1120+960)/V = 13 \text{ (sec)}$$

When performing two-sided copying in this embodiment, the four-sheet transport printing and the three-sheet transport printing are repeated in turn. Accordingly, the copying time T1 required for printing one image in this embodiment is determined by dividing the four-sheet copying time T4 and the three-sheet copying time T3 by the number of printed images (8+6).

$$T1 = (T4+T3)/(8+6) = (14+13)/14 = 1.928 \text{ (sec)}$$

The copying speed to be determined here is the number of images formed per minute. Accordingly, the two-sided copying speed A1 is determined by dividing 60 seconds by the coping time required for one image.

$$A1 = 60/T1 = 31.12 \text{ cpm}$$

(2) Likewise, the two-sided copying speed A2 of the conventional digital copying machine is determined as follows.

In the conventional two-sided copy mode, the fixed sheet interval value d2 is used for printing images on A4Y size paper sheets, and the value M is 3.5. Accordingly, three-sheet transport printing is repeated.

Using the copying time T3 (=13) for printing six images determined above, the copying speed A2 is calculated by the following equation.

$$A2 = 60/(T3/6) = 27.69 \text{ cpm}$$

(3) The one-sided copying speed is determined as follows.

The one-sided copying sheet interval value d2 is 110 mm, and the copying time T required for printing an image on a paper sheet is determined by dividing the sheet length x plus a predetermined sheet interval value d by the transporting speed V.

$$T=(x+d2)/V=(210+110)/160=2 \text{ (sec)}$$

Accordingly, the copying speed A2 is determined as follows.

$$A3=60/2=30 \text{ cpm}$$

When performing two-sided copying by the digital copying machine of this embodiment, the sheet intervals are changed depending on whether the circulation cycle has been repeated for an even or an odd number times. However, the setting of sheet intervals is not limited to this manner, but the first circulation cycle may be performed at short sheet intervals, and the second and third circulation cycles may be performed at normal sheet intervals. This process may be repeated. For instance, when using A4Y size paper sheets, four-sheet transport printing and three-sheet transport printing are repeated in the following order: 4, 3, 3, 4, 3, 3, . . . Using the copying times T4 and T3, the average copying speed A4 is determined by the following equation.

$$\begin{aligned}A4 &= 60/[(T4+T3+T3)/(8+6+6)] \\ &= 60/[(14+13+13)/(8+6+6)] \\ &= 30 \text{ cpm}\end{aligned}$$

This copying speed A4 is the same as the one-sided copying speed.

The digital copying machine of this embodiment selects from two-sheet transport printing, three-sheet transport printing, and four-sheet transport printing, depending on the determined value M, but printing is not limited to this manner. Specifically, a table containing sheet size data, sheet interval data, and corresponding printing process types (two-sheet, three-sheet, and four-sheet transport printing) may be provided for the printer control unit. Referring to the table, the printer control unit may perform two-sided copying at sheet intervals in accordance with the sheet size, and select transport printing process corresponding to the sheet size.

Second Embodiment

The digital copying machine of the second embodiment is substantially the same as the digital copying machine of the first embodiment, except for the transport path length L, the sheet interval data stored inside the printer control unit 340, and the control operations of the printer control unit 340. Accordingly, the following description focuses on the different aspects, while explanations for the common parts are omitted.

In this embodiment, the transport path length L is substantially the same as twice or a larger integral multiple of the total of the length of a paper sheet of a specified size in a specified direction plus, and a sheet interval used in the one-sided copy mode.

More specifically, the transport path length is set at 1280 mm, which is four times 320 mm, the total of the length of an A4Y paper sheet in the transporting direction (210 mm) and the sheet interval used in the one-sided copy mode (110 mm).

Inside the printer control unit 340, sheet interval values d=ds and d=dw (ds>dw) are stored, and ds is set at 110 mm.

With a digital copying machine of the above structure, the number of A4Y paper sheets simultaneously containable in the circular transport path is limited to four either at the one-sided copy mode sheet intervals (110 mm) or the two-sided copy mode sheet intervals (70 mm).

Even if paper sheets are supplied at the one-sided copy mode sheet intervals when in the two-sided copy mode, the copying speed will be substantially the same as in the case where paper sheets are supplied at the two-sided copy mode sheet intervals. Accordingly, even in the two-sided copy mode, there is no need to make the sheet intervals shorter than the one-sided copy mode sheet intervals.

When feeding paper sheets of a specified size in a specified direction, the paper sheets are supplied at the one-sided copy mode sheet intervals, even in the two-sided copy mode. When feeding paper sheets of a different size from the specified size in the two-sided copy mode, the paper sheets should be supplied at sheet intervals shorter than the one-sided copy mode sheet intervals.

It should be understood that the specified sheet size in the specified direction is not limited to A4Y. It may be legal pad size in a transverse direction, for instance.

Figure 7:
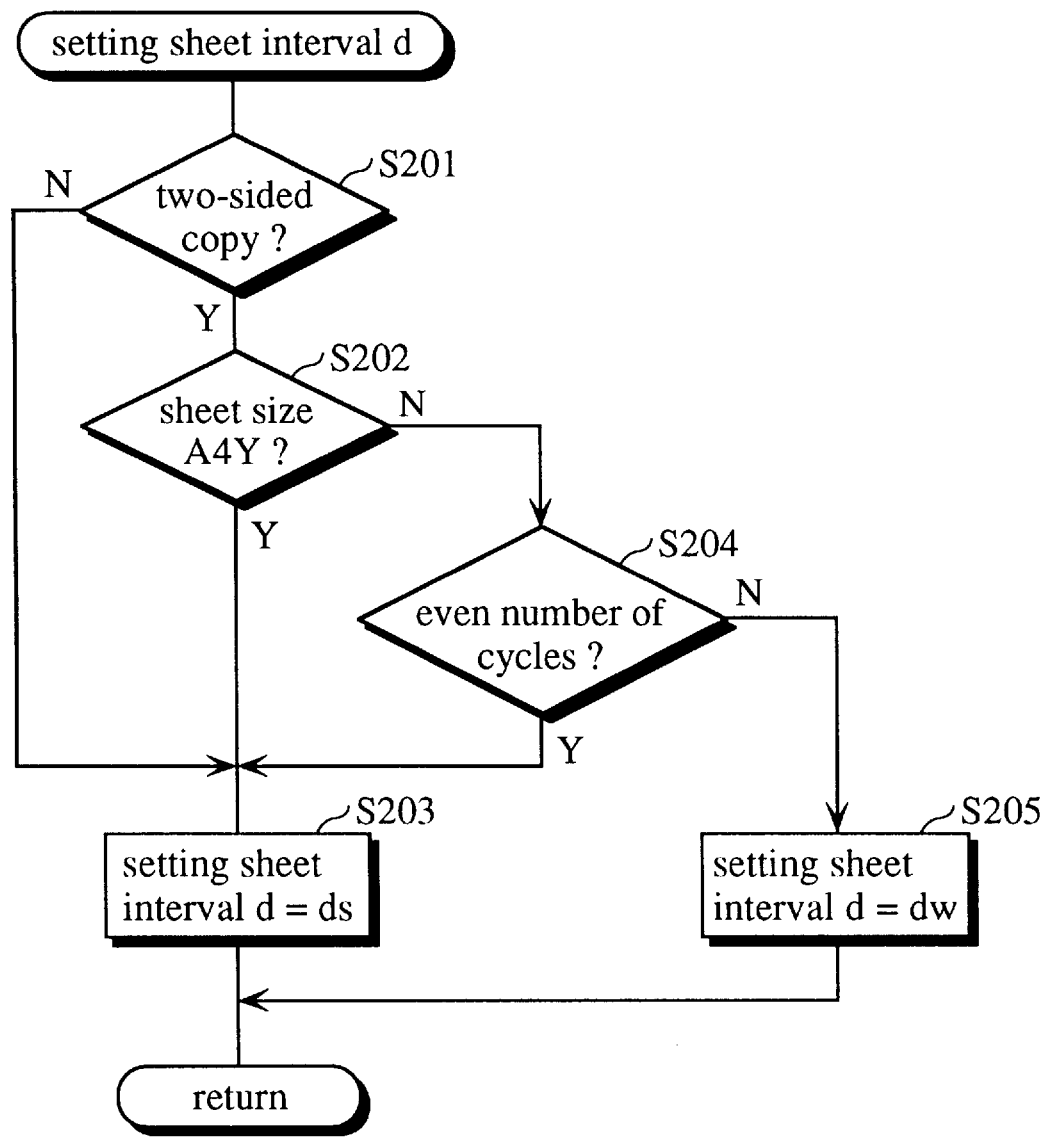
FIG. 7 is a flow chart showing the process of setting sheet intervals by the printer control unit in the control unit of the second embodiment.

The control operations of the printer control unit 340 of this embodiment are substantially the same as those of the first embodiment, except that the process shown in the flow chart of FIG. 7 is performed instead of the process shown in the flow chart of FIG. 4. Accordingly, the following explanation is mainly for the flow chart of FIG. 7.

The flow chart of FIG. 7 shows the process of setting sheet intervals.

The sheet interval value is set at ds in step S203, ds being the one-sided copy mode sheet interval value, in any of the following cases: where the copying machine is not in the two-sided copy mode in step S201; where the sheet size is judged to be A4Y in step S202, though the copying machine is in the two-sided copy mode; and where the copying machine is in the two-sided copy mode in step S201, the sheet size is judged to be other than A4Y in step S202, and the circular cycle process is judged to be performed for an even number repetition in step S204.

The sheet interval value is set at dw in step S205, dw being smaller than the one-sided copy mode sheet interval value ds, in the case where the copying machine is in the two-sided copy mode in step S201, the sheet size is judged to be other than A4Y in step S201, and the circular cycle process is judged to be performed for an odd number repetition in step S204.

The present invention can be applied to a digital copying machine provided with a two-sided copy tray. In the digital copying machine of the first embodiment shown in FIG. 1, the two-sided copy tray having the same structure as the paper cassettes 80a and 80b is disposed ranging from the mid-point between the switchback roller 603 and the transport roller 86a to the mid-point between the transport roller 86c and the intermediate roller 87. The two-sided copy tray is provided with a re-feeding roller which is the same as the feeding rollers 80c and 80d. In this case, the transport rollers 80a to 80c and the adjacent part of the transport path are removed. With this two-sided copy tray, paper sheets turned over by the sheet re-feeding unit 600 for two-sided copying are introduced into the two-sided copy tray and re-fed to the main body of the copying machine by rotating the re-feeding roller.

When printing images on both sides of a paper sheet stored on the two-sided copy tray, paper sheets are fed to the main body of the copying machine at sheet intervals shorter than the sheet intervals at which paper sheets for front-side printing are fed. Accordingly, the processing speed of the back-side printing is higher because the sheet intervals are shorter, and the overall copying speed is thus increased. Transporting and printing can be performed at shorter sheet intervals as described above, because the paper sheet stored on the two-sided copy tray have already been heated through the front-side printing, and the temperature of the fixing roller does not drop drastically.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A digital copying machine capable of two-sided copying, which forms an image on one side of a sheet, transports said sheet through a sheet re-feeding path provided with a sheet turning over unit, forms an image on the other side of said sheet, and finally delivers said sheet outside, comprising:

an image forming mode setting unit for setting either a one-sided copy mode or a two-sided copy mode in accordance with an instruction from a user;

a sheet supplying unit for supplying sheets one by one;

an image forming unit for forming an image on a sheet being supplied;

a sheet transporting unit for leading a sheet with an image formed on one side of it to said sheet re-feeding path in said two-sided copy mode, and discharging a sheet with an image formed on each side of it in said two-sided copy mode or a sheet with an image formed on one side of it in said one-sided copy mode; and a control unit for controlling said sheet supplying unit so as to supply sheets at first sheet intervals in said one-sided copy mode and at second sheet intervals in said two-sided copy mode, said second sheet intervals being shorter than said first sheet intervals.

2. A digital copying machine capable of two-sided copying, which forms an image on one side of a sheet, transports said sheet through a sheet re-feeding path provided with a sheet turning over unit, forms an image on the other side of said sheet, and finally delivers said sheet outside, comprising:

an image forming mode setting unit for setting either a one-sided copy mode or a two-sided copy mode in accordance with an instruction from a user;

a sheet supplying unit for supplying sheets one by one;

an image forming unit for forming an image on a sheet being supplied;

a sheet transporting unit for leading a sheet with an image formed on one side of it to said sheet re-feeding path in said two-sided copy mode, and discharging a sheet with an image formed on each side of it in said two-sided copy mode or a sheet with an image formed on one side of it in said one-sided copy mode; and a control unit for controlling said sheet supplying unit so as to supply sheets at first sheet intervals in said one-sided copy mode and at second sheet intervals in said two-sided copy mode, said second sheet intervals being shorter than said first sheet intervals;

wherein said sheet supplying unit comprises a sheet feeding unit for feeding a sheet, and said control unit comprises:

a sheet interval data storing unit for storing data of at least two types of sheet intervals including said first sheet interval and said second sheet interval corresponding to at least one size of sheet;

a sheet interval selecting unit for selecting one type of sheet interval from said stored sheet interval data in accordance with a copy mode being set; and a feed control unit for controlling said feeding unit so as to feed sheets at sheet intervals corresponding to a selected type of sheet interval.

3. A digital copying machine according to claim 2, further comprising a feed prohibiting unit for temporarily prohibiting sheet feeding until two-sided copying is completed on a predetermined unit number of sheets fed from said feeding unit in said two-sided copy mode, said predetermined unit number being 2 or larger.

4. A digital copying machine according to claim 3, further comprising a sheet unit number determining unit for determining the maximum number of sheets which can be present simultaneously in a circular transport path starting from an image forming position where images are formed by said image forming unit and ending in said image forming position via said sheet re-feeding path, wherein said feed prohibiting unit prohibits sheet feeding until two-sided copying is completed on said unit number of sheets determined by said sheet unit number determining unit.

5. A digital copying machine according to claim 4, wherein said second sheet interval data defines that said unit number of sheets determined by said sheet unit number determining unit is at least one larger than said unit number of sheets determined from said first sheet interval.

6. A digital copying machine according to claim 3, further comprising a supply time counting unit for counting the number of times said sheet supplying unit supplies said unit number of sheets in said two-sided copy mode;

a judging unit for judging whether said number of supply times is included in a first group or a second group; and a sheet interval selection changing unit for instructing said sheet interval selecting unit to select sheet intervals depending on whether said number of supply times belongs to said first group or to said second group.

7. A digital copying machine according to claim 6, wherein said judging unit makes judgement with odd numbers belonging to said first group and even numbers belonging to said second group, and said sheet interval selection changing unit instructs said sheet interval selecting unit to select said second sheet interval in the case of said first group and to select said first sheet interval in the case of said second group.

8. A digital copying machine according to claim 2, wherein said sheet interval data storing unit stores first sheet interval data and second sheet interval data for each sheet size; and said sheet interval selecting unit selects sheet interval data corresponding to the size of a sheet supplied from said sheet supplying unit.

9. A digital copying machine capable of two-sided copying, which forms an image on one side of a sheet, transports said sheet through a sheet re-feeding path provided with a sheet turning over unit, forms an image on the other side of said sheet, and finally delivers said sheet outside, comprising:

an image forming mode setting unit for setting either a one-sided copy mode or a two-sided copy mode in accordance with an instruction from a user;

a sheet supplying unit for supplying sheets one by one;

an image forming unit for forming an image on a sheet being supplied;

a sheet transporting unit for leading a sheet with an image formed on one side of it to said sheet re-feeding path in said two-sided copy mode, and discharging a sheet with an image formed on each side of it in said two-sided copy mode or a sheet with an image formed on one side of it in said one-sided copy mode; and a control unit for controlling said sheet supplying unit so as to supply sheets at first sheet intervals in said one-sided copy mode and at second sheet intervals in said two-sided copy mode, said second sheet intervals being shorter than said first sheet intervals;

wherein the length of a circular transport path starting from an image forming position where images are formed by said image forming unit and ending in said image forming position via said sheet re-feeding path is equal to twice or a larger integral multiple of the total of the lengths of a sheet of a specified size fed in a specified direction and said first sheet interval, and wherein, when feeding sheets of said specified size in said specified direction, said control unit controls said sheet supplying unit so as to supply sheets at said first sheet intervals even in said two-sided copy mode.

10. A digital copying machine according to claim 9, wherein said specified size is A4, and said specified direction is transverse.

11. A digital copying machine according to claim 9, wherein said specified size is legal pad size, and said specified direction is transverse.

12. A digital copying machine capable of two-sided copying, which forms an image on one side of a sheet, transports said sheet through a sheet re-feeding path provided with a sheet turning over unit, forms an image on the other side of said sheet, and finally delivers said sheet outside, comprising:

an image forming mode setting unit for setting either a one-sided copy mode or a two-sided copy mode in accordance with an instruction from a user;

a sheet supplying unit for supplying sheets one by one;

an image forming unit for forming an image on a sheet being supplied;

a sheet transporting unit for leading a sheet with an image formed on one side of it to said sheet re-feeding path in said two-sided copy mode, and discharging a sheet with an image formed on each side of it in said two-sided copy mode or a sheet with an image formed on one side of it in said one-sided copy mode; and a control unit for controlling said sheet supplying unit so as to supply sheets at first sheet intervals in said one-sided copy mode and at second sheet intervals in said two-sided copy mode, said second sheet intervals being shorter than said first sheet intervals;

wherein said image forming unit comprises a photosensitive drum, a sensitizing charger, a developing unit, a transferring unit, each of said three components provided around said photosensitive drum, and a fixing unit for fixing a toner image transferred onto a sheet by said transferring unit, and said image forming unit forms an image by an electrostatic copying technique, and wherein;

said second sheet interval is determined from the heating ability of said fixing unit.

13. A digital copying machine according to claim 12, wherein said sheet supplying unit comprises a sheet storing unit capable of storing a large number of sheets and a feeding roller for feeding said stored sheets one by one, said sheet transporting unit comprises a register roller for transporting sheets supplied from said sheet supplying unit or circulated through said sheet re-feeding path to said transferring unit in synchronism with image formation on said photosensitive drum, a switching unit for switching between discharging toner fixed sheets outside said copying machine and introducing toner fixed sheets into said sheet re-feeding path, and a roller or belt for transporting sheets, and said control unit controls sheet intervals by adjusting periods during which said feeding roller is intermitted.

14. A digital copying machine according to claim 13, wherein said image forming unit further comprises an optical unit for writing light-modulated image data onto said photosensitive drum, and intervals between said image data writing operations by said optical unit are determined from said sheet intervals controlled by said control unit.

15. A digital copying machine according to claim 14, wherein said control unit comprises:

a sheet interval data storing unit for storing data of at least two types of sheet intervals including sheet interval data whose interval length is shorter than an interval length in said one-sided copy mode;

a sheet interval selecting unit for selecting one type of sheet interval from said stored sheet interval data in accordance with a copy mode being set; and a feed control unit for controlling said feeding unit so as to feed sheets at sheet intervals corresponding to a selected type of sheet interval.

16. A digital copying machine according to claim 15, further comprising a feed prohibiting unit for temporarily prohibiting sheet feeding until two-sided copying is completed on a predetermined unit number of sheets fed from said feeding unit in said two-sided copy mode, said predetermined unit number being 2 or larger.

17. A digital copying machine according to claim 16, further comprising a sheet unit number determining unit for determining the maximum number of sheets which can be present simultaneously in a circular transport path starting from a transferring position where a toner image is transferred onto a sheet by said transferring unit and ending in said transferring position via said sheet re-feeding path, wherein said feed prohibiting unit prohibits sheet feeding until two-sided copying is completed on said unit number of sheets determined by said sheet unit number determining unit.

18. A digital copying machine capable of two-sided copying, which forms an image on one side of a sheet fed from a sheet feeding tray, stores said sheet temporarily in a two-sided copy tray, forms an image on the other side of said sheet re-fed from said two-sided copy tray, and finally delivers said sheet outside, characterized by a sheet re-feeding unit for re-feeding sheets from said two-sided copy tray at sheet intervals shorter than sheet intervals at which sheets are fed from said sheet feeding tray.

19. An image forming method using a digital copying machine comprising: an image forming mode setting unit for setting either a one-sided copy mode or a two-sided copy mode in accordance with an instruction from a user; a sheet supplying unit for supplying sheets one by one; an image forming unit for forming an image on a sheet being supplied; and a sheet transporting unit for leading a sheet with an image formed on one side of it to a sheet re-feeding path in said two-sided copy mode, and discharging a sheet with an image formed on each side of it in said two-sided copy mode or a sheet with an image formed on one side of it in said one-sided copy mode, comprising the steps of:

(1) judging whether said one-sided copy mode or said two-sided copy mode has been set; and (2) in said two-sided copy mode, supplying sheets at sheet intervals shorter than sheet intervals at which paper sheets are supplied in said one-sided copy mode.

* * * * *